(12) United States Patent
Bouchez et al.

(10) Patent No.: US 9,793,836 B2
(45) Date of Patent: Oct. 17, 2017

(54) POWER MODULE AND ELECTRIC DEVICE FOR THE COMBINED POWERING AND CHARGING OF AN ACCUMULATOR AND A MOTOR RESPECTIVELY

(71) Applicant: Valeo Systemes de Controle Moteur, Cergy Saint Christophe (FR)

(72) Inventors: Boris Bouchez, Cergy (FR); Luis De Sousa, Eragny sur Oise (FR); Bénédicte Silvestre, Vaux sur Seine (FR)

(73) Assignee: Valeo Systemes de Controle Moteur, Cergy Saint Christophe (FR)

( * ) Notice: Subject to any disclaimer, the term of this patent is extended or adjusted under 35 U.S.C. 154(b) by 0 days.

(21) Appl. No.: 14/355,303

(22) PCT Filed: Oct. 30, 2012

(86) PCT No.: PCT/FR2012/052515
§ 371 (c)(1),
(2) Date: Apr. 30, 2014

(87) PCT Pub. No.: WO2013/064780
PCT Pub. Date: May 10, 2013

(65) Prior Publication Data
US 2014/0292243 A1    Oct. 2, 2014

(30) Foreign Application Priority Data
Nov. 2, 2011   (FR) ...................................... 11 59907

(51) Int. Cl.
*H02P 6/00*   (2016.01)
*H02P 6/14*   (2016.01)
(Continued)

(52) U.S. Cl.
CPC .............. *H02P 6/14* (2013.01); *H02M 7/003* (2013.01); *H02M 7/797* (2013.01)

(58) Field of Classification Search
CPC ....... H01L 2924/00; H01L 2224/48091; H01L 2924/1305; H01L 2924/13055;
(Continued)

(56) References Cited

U.S. PATENT DOCUMENTS 4,360,801 A * 11/1982 Duhame .............. G08B 17/117
                                                    318/16
4,433,274 A *  2/1984 Duhame .............. G08B 17/117
                                                    318/16
(Continued)

FOREIGN PATENT DOCUMENTS

CN       101523597 A      9/2009
DE    102009045279 A1    4/2011
(Continued)

OTHER PUBLICATIONS

International Search Report issued in PCT/FR2012/052515 mailed on Oct. 22, 2013 (6 pages).
(Continued)

*Primary Examiner* — Paul Ip
(74) *Attorney, Agent, or Firm* — Osha Liang LLP (57) ABSTRACT

The invention relates to a power module (9) for converting an electric current flowing between an accumulator and an alternating-current motor, said module (9) comprising switching means (10) that can be controlled to authorize the powering of the motor and/or the charging of the accumulator, and an intrinsic control unit (13) connected to said switching means (10) and capable of delivering opening and/or closing signals to said switching means (10), said intrinsic control unit (13) being further capable of exchanging data with a remote control unit, with a potential barrier.

19 Claims, 2 Drawing Sheets

(51) Int. Cl.
*H02M 7/00* (2006.01)
*H02M 7/797* (2006.01)

(58) Field of Classification Search
CPC . H01L 2924/13091; H01L 2924/00014; H01L 2924/0002; H01L 2224/45124; H01L 2224/45147; H01L 25/16; H01L 2924/30107; H01L 2924/302
USPC .............. 318/139, 434, 400.29, 400.3, 811; 363/37, 39, 41; 361/603
See application file for complete search history.

(56) References Cited

U.S. PATENT DOCUMENTS

| | | | | |
|---|---|---|---|---|
| 4,464,651 A * | 8/1984 | Duhame | ............... | G08B 17/117 318/16 |
| 4,944,056 A * | 7/1990 | Schroeder | ............ | A61G 7/1015 5/85.1 |
| 4,947,053 A * | 8/1990 | Campbell et al. | ............ | 307/10.1 |
| 4,987,351 A * | 1/1991 | Disser | ............... | H02P 27/08 318/78 |
| 5,055,762 A * | 10/1991 | Disser | ............... | H02M 7/53875 318/811 |
| 5,225,754 A * | 7/1993 | Eckersley | ............... | B66B 1/30 187/293 |
| 5,420,487 A * | 5/1995 | Eckersley | ............... | B66B 1/30 318/560 |
| 5,465,011 A * | 11/1995 | Miller et al. | .................... | 307/64 |
| 5,517,402 A * | 5/1996 | Ikeda | .................. | H02M 7/5387 363/132 |
| 5,610,493 A * | 3/1997 | Wieloch | ............... | H02M 7/003 318/801 |
| 5,623,191 A * | 4/1997 | Wieloch | ............... | H02M 7/003 318/801 |
| 5,650,709 A * | 7/1997 | Rotunda | ............ | H02M 7/53875 318/802 |
| 5,747,955 A * | 5/1998 | Rotunda | ............... | A63B 22/025 318/432 |
| 5,856,736 A * | 1/1999 | Rotunda | ............ | H02M 7/53875 318/802 |
| 5,900,683 A * | 5/1999 | Rinehart | ............ | H03K 17/0828 307/126 |
| 5,969,569 A * | 10/1999 | Marceau | ............... | H02H 5/005 327/574 |
| 5,969,966 A * | 10/1999 | Sawa | ............... | H02M 5/271 363/10 |
| 6,014,323 A * | 1/2000 | Aiello | ............... | H02M 5/271 323/361 |
| 6,151,227 A * | 11/2000 | Mizutani | ............... | H02M 7/49 363/41 |
| 6,229,722 B1 * | 5/2001 | Ichikawa | ............... | H02M 7/10 363/71 |
| 6,295,510 B1 * | 9/2001 | Discenzo | ............... | H02K 11/001 310/50 |
| 6,379,837 B1 * | 4/2002 | Takahashi et al. | ............ | 429/151 |
| 6,410,185 B1 * | 6/2002 | Takahashi et al. | ............ | 429/163 |
| 6,472,098 B1 * | 10/2002 | Sawada et al. | ............... | 429/163 |
| 6,496,393 B1 | 12/2002 | Patwardhan | | |
| 6,534,208 B1 * | 3/2003 | Zinser | ............... | 429/9 |
| 6,757,597 B2 * | 6/2004 | Yakes | ............... | B60L 11/123 180/65.22 |
| 6,885,920 B2 * | 4/2005 | Yakes | ............... | A62C 27/00 180/65.1 |
| 6,956,461 B2 * | 10/2005 | Yoon | ............... | G05B 19/0421 340/12.52 |
| 7,277,782 B2 * | 10/2007 | Yakes | ............... | B60K 6/46 180/65.245 |
| 7,428,158 B2 * | 9/2008 | Bousfield, III | ............ | H02M 1/12 363/39 |
| 7,433,214 B2 * | 10/2008 | Kunow | ............... | H02M 3/285 307/61 |
| 7,453,170 B2 * | 11/2008 | Kunow | ............... | H02M 3/1584 307/151 |
| 7,615,893 B2 * | 11/2009 | Biester | ............... | E21B 33/0355 307/82 |
| 7,622,887 B2 * | 11/2009 | Yoshimura | ............... | H02M 1/08 318/810 |
| 7,742,855 B2 * | 6/2010 | Louise | ............... | H02P 9/02 290/36 R |
| 7,759,827 B2 * | 7/2010 | Kunow | ............... | H02M 3/285 166/335 |
| 7,800,346 B2 * | 9/2010 | Bolz et al. | ............ | 320/166 |
| 7,809,786 B2 * | 10/2010 | Yoon | ............... | G05B 19/0421 709/203 |
| 7,821,220 B2 * | 10/2010 | El-Ibiary | ............... | H02K 11/0073 318/538 |
| 7,826,985 B2 * | 11/2010 | Weiss | ............... | H02P 27/00 702/42 |
| 7,830,681 B2 * | 11/2010 | Abolhassani | ............... | H02M 7/49 363/37 |
| 7,855,475 B2 * | 12/2010 | Fitzgibbon | ............... | E05F 15/603 307/116 |
| 7,880,343 B2 * | 2/2011 | Kleinecke | ............... | H02M 7/10 307/412 |
| 7,990,242 B2 * | 8/2011 | Owen | ............... | H01F 27/343 336/12 |
| 8,045,346 B2 * | 10/2011 | Abolhassani | ............... | H02M 7/49 363/37 |
| 8,068,014 B2 * | 11/2011 | Steiner | ............... | H04B 3/54 340/12.38 |
| 8,076,885 B2 * | 12/2011 | Heravi | ............... | B66D 1/58 318/400.21 |
| 8,106,536 B2 * | 1/2012 | Kunow | ............... | H02M 3/1584 307/82 |
| 8,188,694 B2 * | 5/2012 | Tallam | ............... | H02M 5/4585 318/400.3 |
| 8,223,515 B2 * | 7/2012 | Abolhassani | ............... | H01F 27/385 363/34 |
| 8,248,009 B2 * | 8/2012 | Campbell | ............... | H02P 31/00 318/111 |
| 8,279,640 B2 * | 10/2012 | Abolhassani | ............... | H01F 30/12 363/37 |
| 8,284,575 B2 * | 10/2012 | Inamura | ............... | H02M 1/08 318/800 |
| 8,400,092 B2 * | 3/2013 | Kasunich | ............... | H02P 6/001 318/400.33 |
| 8,406,026 B2 * | 3/2013 | Fukuta | ............... | H02M 1/084 363/132 |
| 8,456,866 B2 * | 6/2013 | Funaba | ............... | H02M 1/08 363/17 |
| 8,482,240 B2 * | 7/2013 | El-Ibiary | ............... | H02K 11/0073 318/400.09 |
| 8,536,731 B2 * | 9/2013 | Biester | ............... | E21B 33/0355 251/315.01 |
| 8,554,877 B2 * | 10/2013 | Davis | ............... | G05B 19/4185 700/1 |
| 8,635,731 B2 * | 1/2014 | Garner | ............... | A46B 9/045 15/22.1 |
| 8,692,408 B2 * | 4/2014 | Zhang | ............... | H02M 5/458 307/12 |
| 8,766,584 B2 * | 7/2014 | Gries | ............... | H02M 1/15 318/455 |
| 8,981,722 B2 * | 3/2015 | Miura et al. | ............... | 320/118 |
| 2002/0073183 A1 * | 6/2002 | Yoon | ............... | G05B 19/0421 709/220 |
| 2004/0027757 A1 * | 2/2004 | Minatani | ............... | B60L 3/0023 361/91.1 |
| 2004/0263100 A1 * | 12/2004 | Heravi | ............... | B60P 3/12 318/280 |
| 2005/0162273 A1 * | 7/2005 | Yoon | ............... | G05B 19/0421 340/539.14 |
| 2005/0168891 A1 * | 8/2005 | Nilman-Johansson | | H01H 11/0062 361/23 |
| 2006/0151874 A1 * | 7/2006 | Milich et al. | ............... | 257/713 |
| 2006/0279249 A1 * | 12/2006 | Rastogi | ............... | H02M 5/458 318/807 |
| 2007/0058405 A1 * | 3/2007 | Bousfield | ............... | H02M 1/12 363/132 |
| 2007/0109715 A1 * | 5/2007 | Azuma et al. | ............... | 361/299.3 |

(56) References Cited

U.S. PATENT DOCUMENTS

| | | | |
|---|---|---|---|
| 2007/0218595 A1* | 9/2007 | Yoshimura | H02M 1/08 438/138 |
| 2008/0065285 A1* | 3/2008 | Yakes | B60K 6/46 701/22 |
| 2008/0112201 A1* | 5/2008 | Yahata et al. | 363/131 |
| 2008/0158824 A1 | 7/2008 | Aoki et al. | |
| 2008/0158921 A1* | 7/2008 | Stefanutti | B60L 9/30 363/67 |
| 2008/0197797 A1* | 8/2008 | El-Ibiary | H02K 11/0073 318/567 |
| 2008/0224886 A1* | 9/2008 | Rodriguez | G07C 9/00182 340/13.28 |
| 2008/0266801 A1* | 10/2008 | Weiss | H01L 23/427 361/700 |
| 2008/0266802 A1* | 10/2008 | Weiss | H01L 23/427 361/700 |
| 2008/0266803 A1* | 10/2008 | Golhardt | H02K 9/20 361/700 |
| 2008/0278297 A1* | 11/2008 | Steiner | H04B 3/54 340/12.38 |
| 2008/0278969 A1* | 11/2008 | Bolz et al. | 363/17 |
| 2008/0304296 A1* | 12/2008 | NadimpalliRaju | H02J 4/00 363/45 |
| 2009/0058305 A1* | 3/2009 | Hofer | B64G 1/405 315/111.91 |
| 2009/0059637 A1 | 3/2009 | Sato et al. | |
| 2009/0125176 A1* | 5/2009 | Louise | H02P 9/02 701/34.4 |
| 2009/0251009 A1* | 10/2009 | Kleinecke | H02M 7/10 307/115 |
| 2009/0267420 A1* | 10/2009 | Kristensen | A47C 20/041 307/126 |
| 2009/0273308 A1* | 11/2009 | Matsuo | H02P 25/021 318/450 |
| 2009/0276165 A1* | 11/2009 | Weiss | H02P 29/02 702/34 |
| 2009/0284079 A1* | 11/2009 | Jahkonen | 307/82 |
| 2009/0284877 A1* | 11/2009 | Heravi | B66D 1/58 361/31 |
| 2010/0007300 A1* | 1/2010 | Hein | H02P 29/0088 318/503 |
| 2010/0019876 A1* | 1/2010 | Owen | H01F 27/343 336/84 R |
| 2010/0019930 A1* | 1/2010 | Biester | E21B 33/0355 340/850 |
| 2010/0072824 A1* | 3/2010 | Abolhassani | H02M 7/49 307/82 |
| 2010/0073970 A1* | 3/2010 | Abolhassani | H01F 30/12 363/37 |
| 2010/0079096 A1* | 4/2010 | Braun | G05B 19/042 318/494 |
| 2010/0080024 A1* | 4/2010 | Wei | H02M 1/32 363/74 |
| 2010/0088047 A1* | 4/2010 | Campbell | H02P 29/02 702/58 |
| 2010/0107498 A1* | 5/2010 | Ley | E05F 15/70 49/199 |
| 2010/0117578 A1* | 5/2010 | Hollenbeck | E05F 15/668 318/461 |
| 2010/0123420 A1* | 5/2010 | Campbell | H02P 31/00 318/558 |
| 2010/0123422 A1* | 5/2010 | Campbell | G05B 19/4148 318/600 |
| 2010/0123423 A1* | 5/2010 | Campbell | G05B 19/4083 318/600 |
| 2010/0123424 A1* | 5/2010 | Campbell | H02P 29/045 318/600 |
| 2010/0123425 A1* | 5/2010 | Campbell | G05B 19/408 318/600 |
| 2010/0133901 A1* | 6/2010 | Zhang | H02M 5/458 307/11 |
| 2010/0148578 A1* | 6/2010 | Wagoner | H02M 7/48 307/17 |
| 2010/0155158 A1* | 6/2010 | Azuma et al. | 180/65.8 |
| 2010/0207559 A1* | 8/2010 | Imai | 318/400.23 |
| 2010/0213921 A1* | 8/2010 | Abolhassani | H01F 27/385 323/328 |
| 2010/0328848 A1* | 12/2010 | Ledezma | H02P 27/14 361/603 |
| 2011/0012542 A1* | 1/2011 | Inamura | H02M 1/08 318/139 |
| 2011/0013428 A1* | 1/2011 | Abolhassani | H02M 7/49 363/37 |
| 2011/0025249 A1* | 2/2011 | El-Ibiary | H02K 11/0073 318/567 |
| 2011/0058391 A1* | 3/2011 | Ueno | 363/13 |
| 2011/0058400 A1* | 3/2011 | Fukuta | H02M 1/084 363/131 |
| 2011/0140665 A1* | 6/2011 | Tamezane et al. | 320/118 |
| 2011/0149467 A1* | 6/2011 | Azuma et al. | 361/306.2 |
| 2011/0149625 A1* | 6/2011 | Azuma et al. | 363/141 |
| 2011/0174561 A1* | 7/2011 | Bowman | 180/65.245 |
| 2011/0187484 A1* | 8/2011 | Owen | H01F 30/12 336/5 |
| 2011/0203822 A1* | 8/2011 | Harada | B25B 23/1405 173/20 |
| 2011/0214894 A1* | 9/2011 | Harada | B25B 21/02 173/181 |
| 2011/0221268 A1* | 9/2011 | Kanazawa et al. | 307/10.1 |
| 2011/0234164 A1* | 9/2011 | Furukawa | 320/118 |
| 2012/0000739 A1* | 1/2012 | Nogi | B60M 3/04 191/50 |
| 2012/0008357 A1* | 1/2012 | Azuma et al. | 363/131 |
| 2012/0051099 A1* | 3/2012 | Funaba | H02M 1/08 363/21.17 |
| 2012/0112528 A1* | 5/2012 | Fassnacht | 307/9.1 |
| 2012/0161708 A1* | 6/2012 | Miura et al. | 320/118 |
| 2012/0235613 A1* | 9/2012 | Huang | B60L 3/0092 318/400.26 |
| 2012/0249044 A1* | 10/2012 | Linda et al. | 318/722 |
| 2012/0286569 A1* | 11/2012 | Pischke et al. | 307/10.1 |
| 2012/0286720 A1* | 11/2012 | Fassnacht et al. | 320/105 |
| 2012/0306468 A1* | 12/2012 | Butzmann et al. | 323/304 |
| 2012/0313562 A1* | 12/2012 | Murao et al. | 318/139 |
| 2013/0026991 A1* | 1/2013 | Roessler | 320/116 |
| 2013/0039097 A1* | 2/2013 | Watanabe | H02M 1/44 363/21.01 |
| 2013/0093376 A1* | 4/2013 | Yoo | H02M 1/126 318/503 |
| 2013/0106429 A1* | 5/2013 | Krause | 324/434 |
| 2013/0175012 A1* | 7/2013 | Yamada | H02K 11/0047 165/121 |
| 2013/0241480 A1* | 9/2013 | Kirimoto et al. | 320/109 |

FOREIGN PATENT DOCUMENTS

| | | | |
|---|---|---|---|
| EP | 0 603 778 A1 | 6/1994 | |
| JP | 2006-300038 A | 11/2006 | |
| JP | 2007-306709 A | 11/2007 | |
| JP | 2008-118815 A | 5/2008 | |
| JP | 2009-206723 | * 9/2009 | |
| JP | 2010-081786 A | 4/2010 | |
| JP | 2010-156014 | * 7/2010 | |
| JP | 2010-207067 | * 9/2010 | H02P 27/06 |
| JP | 2010-252445 A | 11/2010 | |
| JP | 4793225 B2 | 10/2011 | |
| WO | 97/09009 A1 | 3/1997 | |

OTHER PUBLICATIONS

The First Office Action issued in corresponding Chinese Patent Application No. 2012800658373, issued on Feb. 1, 2016 (13 pages).
Preliminary Notice of Reasons for Rejection issued in corresponding Japanese Patent Application No. 2014-539386, mailed on Jun. 21, 2016 (19 pages).

* cited by examiner

POWER MODULE AND ELECTRIC DEVICE FOR THE COMBINED POWERING AND CHARGING OF AN ACCUMULATOR AND A MOTOR RESPECTIVELY

The present invention relates to a power module for converting an electric current flowing between an accumulator and an alternating-current motor. It also relates to an inverter, a converter and an electric device using such a module as well as a powering and charging method implementing such a device.

The invention advantageously applies to the field of electric motor vehicles in which the batteries may power the motor via an inverter and may be recharged when the motor vehicle is at rest. However, although particularly intended for such an application, the module in accordance with the invention could be used in other fields.

Conventionally, an electric vehicle is equipped with high-voltage batteries delivering a direct current to an inverter which converts this direct current into an alternating current making it possible to power an electric motor, the latter setting the vehicle in motion.

So as to recharge these high-voltage batteries, it is known practice to fit the vehicle with an onboard charging device essentially comprising an alternating current-direct current converter making it possible to rectify the alternating power of the electric network in order to charge the batteries. Furthermore, the device can comprise a direct current-direct current (DC/DC) converter, ensuring that the voltage level of the network is matched to that of the batteries.

The electronic components of the power subsystem on the one hand and of the charging subsystem on the other are costly. Moreover, the motor is powered and the batteries are charged at different phases. Also, it has been proposed, in the patent documents EP 0 603 778 and WO 97/09009, to re-use a portion of the motor and of the components used to power it in order to produce the device for charging the batteries.

Accordingly, the inverter and the DC/DC converter can be designed to be reversible. The battery-charging device will in particular be able to use the inverter to form an alternating current-direct current converter as well as the windings of the motor to form associated inductors.

Figure 1:
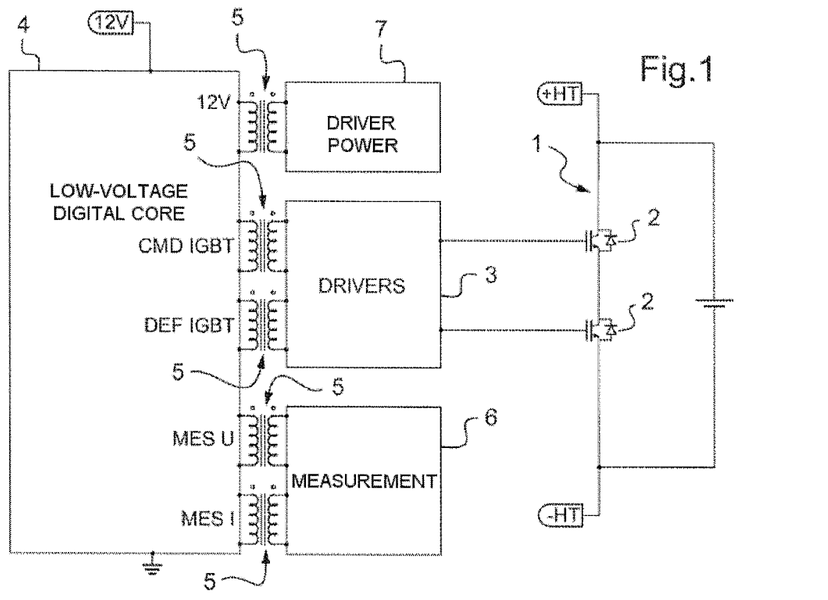

FIG. 1 represents the operating principle of the converters of the prior art. They use one or more control arms 1 equipped with switches 2 the opening/closing of which makes it possible to effect a conversion of current in a known manner.

The opening/closing of the switches is obtained by a drive unit 3 generating a current for closing/opening said switches. The drive unit 3 exchanges information with a control unit 4 transmitting orders determining the opening/closing of the switches 2 to the drive unit 3.

The switches 2 and the drive unit 3 operate at high voltage to be able to convert the current either into direct current, or into alternating current, according to the operating mode of the device. The control unit 4, itself, controls at low voltage (in the order of 12 Volts). Also, to decouple the high-voltage circuit (drive unit 3 and switches 2) from the low-voltage circuit (control unit 4), it is known practice to individually decouple each high-voltage/low-voltage connection, by means of decouplers 5, for example of the opto-coupler and/or transformer type.

Moreover, the standard on electric vehicles enforces isolation of the battery from the bodywork, in order to avoid electrocuting any individual liable to come into contact with the bodywork. To do this, the HT battery is floating, with none of its potentials being linked to the chassis. Isolation cables are provided for each connection between the high-voltage components and the control unit 4, which makes it possible to detach the battery from the chassis.

Other components operating under high voltage are also used such as measuring units 6 or power units 7, notably powering the drive unit 3. The measuring units exchange information with the control unit 4. The power units use the low-voltage circuit to supply current. Thus, decoupling means 5 are also provided between these components and the control unit 4.

For all these reasons, electric devices of the prior art exhibit drawbacks both in terms of connection technology, price and reliability, the latter being linked to the number of components used.

Furthermore, they exhibit a major drawback in terms of reliability, in particular when one and the same control unit 4 is used for several control arms 1. Indeed, if a fault occurs, to date no solutions have been proposed for determining its origin and it ends up being necessary to replace the entire DC/DC converter and/or the inverter.

The invention has the aim of remedying these drawbacks, and proposes for this purpose a power module for converting an electric current flowing between an accumulator and an alternating-current motor, said module comprising switching means, that can be controlled to authorize the powering of the motor and/or the charging of the accumulator, and an intrinsic control unit connected to said switching means and capable of delivering opening and/or closing signals to said switching means, said intrinsic control unit being further capable of exchanging data with a remote control unit, this exchange of data employing at least one potential barrier. The exchange of data is specifically made through at least one potential barrier.

The powering of the motor can be carried out according to various powering modes and the switching means can be controlled to enable these various modes of powering the motor.

Owing to the invention, intelligent functions, previously provided by a main control unit (the control unit 4 in FIG. 1) are removed to the inside of an individual power module, which thus comprises its own control unit and its own associated logic functions. This intrinsic control unit is on the one hand linked up to the switching means of the power module to provide them with a control signal and on the other hand communicates with a remote control unit to receive and transmit data.

The exchanges of signals between the switching means and the intrinsic control unit will be able to take place in a high-voltage environment and not require any potential barrier, only the link with the remote control unit still requiring such a barrier. Owing to the invention, the decoupling supplied by this potential barrier is therefore limited to media that transport only data and the number of decoupling components to be used is limited.

In other words, power modules thus designed can operate independently and themselves produce high-voltage controls, based on data transmitted by the remote control unit.

The potential barrier can be obtained by galvanic isolation, for example by using a transformer and/or an opto-coupler for the decoupling.

It may also be possible to use a communications bus making it possible, for example, to multiplex data signals issuing from several power modules. Intrinsic control units will then be able to communicate at high voltage, module by module, with their switching means, and communicate in the form of data with the remote control unit. The potential barrier can be arranged at the level of the communications bus and the data exchange can involve a passage across the potential barrier of this bus.

The remote control unit is advantageously not part of the power module.

Another advantage of the invention is that the power module can be used equally well inside the inverter or the DC/DC converter. Indeed, to do this it suffices to parameterize the corresponding power module, for example via a communications port in order to program its intrinsic control unit and to make it operate either as a component of an inverter, or as a component of a DC/DC converter. It is thus made possible to fabricate such modules industrially, with specializations being programmable after fabrication.

According to various embodiments, which may be taken together or separately:
- the switching means comprise at least one arm formed from two switches, assembled in series, controlled from said intrinsic control unit,
- the switching means comprise means for driving the switches linked up on the one hand to said intrinsic control unit, and on the other hand to the switches, said driving means being able to supply a current for closing and/or opening the switches from the opening and/or closing signals of said intrinsic control unit,
- said module furthermore comprises measuring means linked up to said intrinsic control unit,
- said module furthermore comprises powering means, linked up at least to said intrinsic control unit and/or to said switching means, as well as to any of said measuring means,
- the switching means are arranged to form an H-bridge structure that can be linked up to a phase of the motor, the switching means then comprising two arms each comprising switches between which a terminal of the phase of the motor is linked,
- the power module is equipped with at least one decoupling capacitor arranged to smooth the voltage at the level of the H-bridge,
- said module comprises a data communications bus, linked up to said intrinsic control unit and able to exchange data with said remote control unit, with a potential barrier on the bus,
- the module comprises galvanic isolation means on said communications bus.

Thus, according to a particular embodiment, each of the modules is equipped with means for measuring current, voltage and temperature, as well as a capacitor and a non-isolated high-voltage power supply, which completes the autonomy of said modules, with a small number of connections.

The interfaces of the module can be limited to:
- two power interfaces for powering the high-voltage module,
- two power interfaces delivering the current exiting the H-bridge
- a control interface for the communications bus.

The invention also relates to a voltage converter comprising:
- at least one power module as described above, and
- a remote control unit configured for exchanging data with the intrinsic control unit of the module across a potential barrier.

The converter can comprise a plurality of power modules and a single remote control unit configured for exchanging data with each intrinsic control unit. The exchange of data can only be done across a single potential barrier.

The voltage converter can be the inverter or the DC/DC converter mentioned below.

The invention also relates to an inverter for the combined powering and charging of an accumulator and an alternating-current motor respectively, the inverter comprising at least one power module as described above.

It could be an inverter for a poly-phase motor, the inverter then being equipped with a number of power modules equal to the number of phases of said motor, each of said power modules being linked up to one of said phases of said motor.

The invention also relates to a DC/DC converter for the combined powering and charging of an accumulator and an alternating-current motor respectively.

The DC/DC converter may or may not be used in combination with the above inverter. In the event of them being combined, said DC/DC converter can be arranged for adapting the voltage level between the accumulator and an inverter. To do this it is equipped with at least one power module as described above.

The invention also relates to an electric device for combined powering and charging, including an alternating-current motor, an accumulator, an inverter equipped with at least one power module as described above, said device also including a remote control unit, able to exchange data with the intrinsic control unit of the power module or modules, for example by a communications bus. The remote control unit can thus communicate with each intrinsic control unit.

This combined powering and charging electric device enjoys the advantages already described, supplied by the power modules according to the invention. Furthermore, thanks to this device, in the presence of a fault, it is possible to determine which of the ports of the communications bus has the fault, and therefore to deduce therefrom the power module effectively at fault. This power module alone can then be replaced, which limits the costs of after-sales service.

Another advantage of the invention is that it is possible to connect a plurality of power modules according to the invention to one and the same telecommunications bus, which communicates with the control unit by way of a limited number of links. Moreover, instead of individually decoupling each of the connections, the decoupling performed by the communications bus is done in a global and multiplexed manner. In this way, the number of connections and isolators is reduced, as is the price of the resulting electric device.

Another advantage of the invention is that it is possible to produce a bespoke combined powering and charging electric device, by choosing for example the number of power modules according to the invention that one desires to use to form the inverter and/or the DC/DC converter.

Preferably, this electric device also includes a DC/DC converter arranged between the accumulator and the inverter, so as to adapt the voltage levels of the accumulator and of the inverter. This converter can itself also be equipped with power modules according to the invention, i.e. modules each equipped with an intrinsic control unit, the remote control unit of the device and the intrinsic control unit of these power modules being connected to one and the same communications bus, so that the remote control unit controls at least a portion of the switching means of these power modules by way of their intrinsic control unit.

A single remote control unit can thus exchange data with each intrinsic control unit of the device, whether the latter belongs to a power module of the inverter or to a power module of the DC/DC converter.

In order to ensure the thermal regulation of the device, it can be proposed that it be integrated into a housing, at least one surface of which is in contact with a water exchanger so as to allow the cooling of said at least one surface. This cooling surface can furthermore comprise a plurality of teeth arranged to increase the size of the exchange surface.

Of course, the invention is also beneficial in electric devices providing only the powering of the motor from the accumulator or only the charging of the accumulator from the motor and the inverters and/or DC/DC converter in accordance with the invention are not necessarily reversible.

The invention also relates to a combined method of powering and charging for implementing the device presented above, this method including a step of controlling the switching means of at least one of the power modules, making it possible to switch from a mode of powering the motor to a mode of charging the accumulator and conversely.

The invention also relates to a method for implementing a combined powering and charging device as described above, wherein the device is implemented by superimposing a plurality of functional electronic layers, said layers being such that:
 a first layer forms the inverter,
 a second layer forms the remote control unit, and
 a third layer forms the DC/DC converter.

This method can include the step according to which the first layer and the second layer are connected using a first communications bus and according to which the second layer and the third layer are connected using a second communications bus.

The invention will be better understood with the help of the appended drawings in which:

FIG. 1, already commented on, schematically represents an electric device of the prior art, FIG. 2 schematically illustrates an exemplary embodiment of a power module according to the invention, FIG. 3 schematically represents an exemplary embodiment of the combined electric powering and charging device in accordance with the invention.

Figure 2:
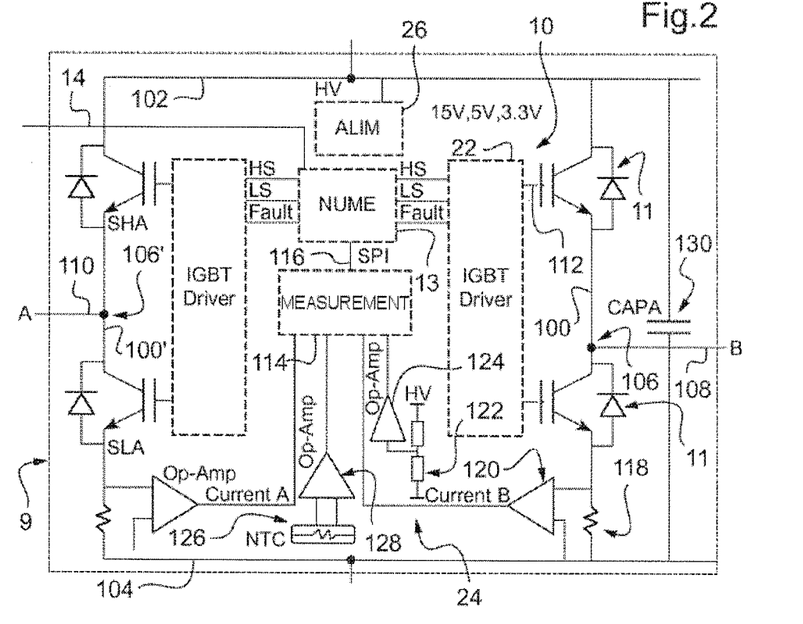

As illustrated in FIG. 2, the invention first of all relates to a power module 9 for converting an electric current flowing between an accumulator and an alternating-current motor, not represented in this figure. Said module 9 comprises in the described example:
 switching means 10 that can be controlled for authorizing the powering of the motor and/or the charging of the accumulator, and
 an intrinsic control unit 13, linked up to said switching means 10 and able to deliver opening and/or closing signals to said switching means 10, said intrinsic control unit 13 being furthermore able to exchange data with a remote control unit, not represented in this figure, with a potential barrier.

The term "linked up" is understood to mean that the intrinsic control unit 13 is electrically linked without galvanic isolation to the switching means 10. The same is generally the case for the various components of the invention that are described as "linked up".

Said control unit 13 is digital in nature. This means that it is capable of processing data in digital format, both at input and at output. It thus defines, for example, a digital core for the module 9.

The switching means 10 comprise at least one arm formed from two switches 11 controlled from said intrinsic control unit 13. The switches are linked up in series between two conductors 102, 104, intended to be linked up to the terminals of a power supply, by way of a connector of the module, not represented. Here, the module comprises two arms 100, 100', a first having a first center tap 106, provided between its two switches 11, and a second having a second center tap 106', provided between its two switches 11. Said center taps 106, 106' are linked up to a connector of the module, not represented, by conductors 108, 110. Each connector enables the connection of a center tap 106, 106' to a terminal of a phase of a motor, as explained below. The switching means 10 are thus arranged to form an H-bridge structure.

The switching means 10 also comprise means 22 for driving the switches 11 linked up on one hand to said intrinsic control unit 13 and on the other hand to the switches 11. Said driving means 22 are capable of supplying a current for closing and/or opening the switches 11 from the opening and/or closing signals of said intrinsic control unit 13.

Here, the switches 11 are defined by transistors, notably of the IGBT or MOSFET type, and the driving means 22 deliver a current to the gates of said transistors by a conductor 112, a current that will determine their on or off state.

The module furthermore comprises, for example, measuring means 24 linked up to said intrinsic control unit 13. They here comprise a measuring unit 114, linked up to the intrinsic control unit 13 by a communications bus 116. They also comprise various components enabling, for example, measurements of the current flowing through the arms 100, 100', measurements of the voltage across the terminals of the arms, or temperature measurements.

The measurement of current is carried out, for example, using resistors 118 provided in series on the arms 100, 100', the voltage across the terminals of the resistor being converted by operational amplifiers 120 that deliver a measurement current to the measuring unit 114.

The measurement of voltage is carried out, for example using a voltage divider 122 associated with the input terminals of an operational amplifier 124 delivering a measurement current to the measuring unit 114.

The measurement of temperature is carried out, for example using a varistor 126 associated with an operational amplifier 128 delivering a measurement current to the measuring unit 114.

The module furthermore comprises, for example, powering means 26, linked up to at least said intrinsic control unit 13 and/or to said switching means 10 and possibly to the measuring means in order to power them. Said powering means 26 are non-isolated and linked up, for example, to the high-voltage power supply, here by the conductor 102 powering the H-bridge.

The module in accordance with the invention could also be equipped with at least one decoupling capacitor 130 arranged to protect the switching means 10. Here it is attached to the conductors 102, 104 powering the H-bridge.

The module can also comprise a data communications bus 14, linked up to said intrinsic control unit 13 and capable of exchanging data with said remote control unit. A potential barrier, not represented in this figure is provided on the bus. It can be galvanic isolation means, such as a transformer and/or an opto-coupler.

In other words, in the illustrated example, the interfaces of the module 9 are limited to:
 two power interfaces, linked up to the conductors 102, 104, for powering the high-voltage module,
 two power interfaces, linked up to the conductors 108, 110 delivering the current exiting the H-bridge,
 a control interface for the communications bus 14.

Said intrinsic control unit 13 provides, for example, the following functions:

- application of the orders received from the remote unit by the communications bus 14, notably orders related to the desired output current,
- determination of the orders of opening/closing of the switches 2 to be transmitted to the driving units 22 (HS, LS signals) based on orders related to the desired output current,
- verification of the consistency of the information received by the communications bus 14,
- production of the diagnoses related to the module, and/or transmission of a complete state of the module to the remote unit, by way of the communications bus 14.

In return for the received orders, the driving means 22 could be designed to be capable of delivering diagnostic information to the intrinsic control unit 13 (Fault signal).

Figure 3:
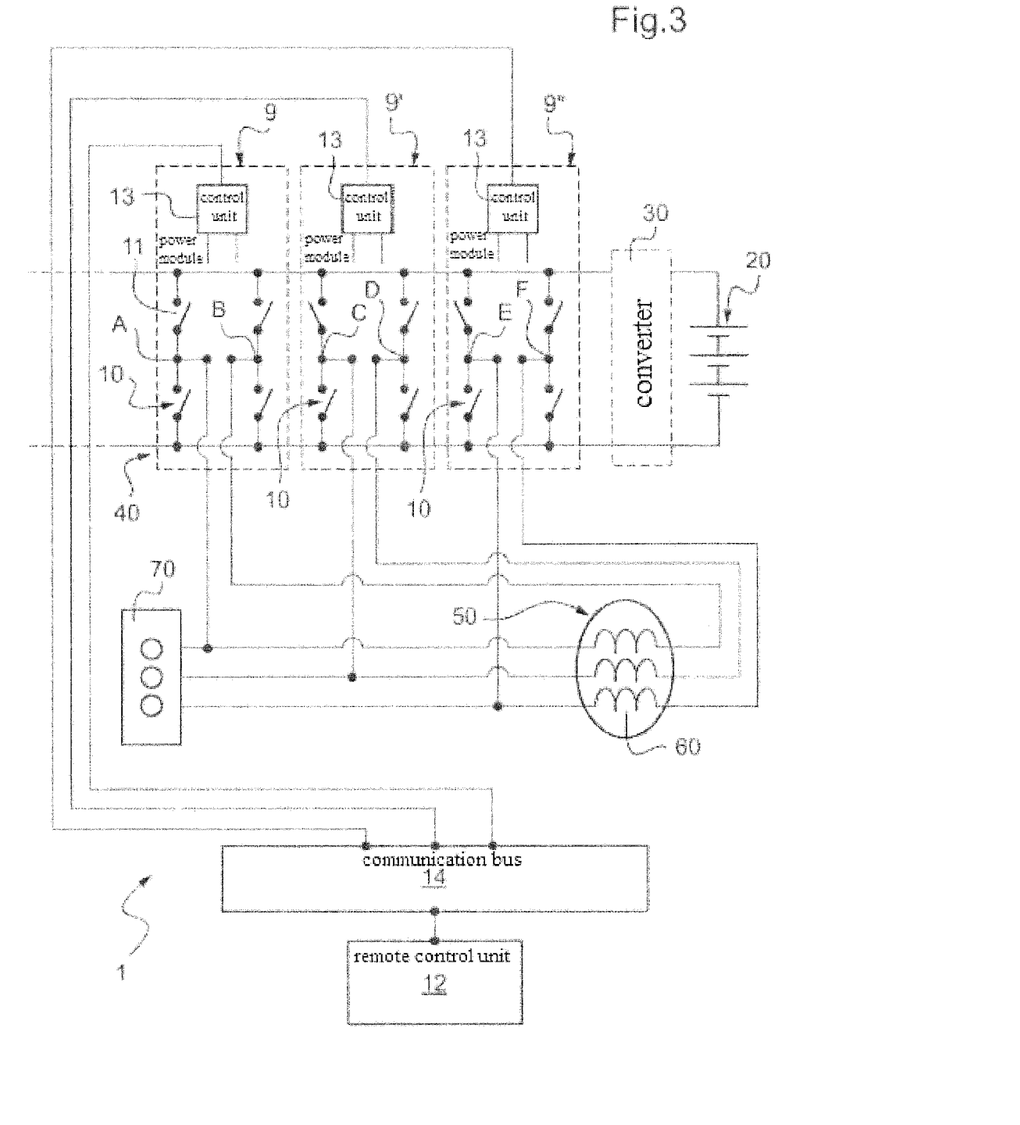

As illustrated in FIG. 3, the invention also relates to a combined electric powering and charging device 1 including, in the example represented, an accumulator 20, a DC/DC converter 30, an inverter 40, an alternating-current motor 50 (here three-phase and with the windings 60 thereof acting as inductors) a communications bus 14, a remote control unit 12 and finally an item of connection technology 70.

The inverter 40 includes a plurality of power modules 9, 9' and 9" as described above. Each module is equipped with an intrinsic control unit 13—or a local control unit—and switching means 10 in the form of an H-bridge structure, one bridge being provided per phase of the motor. This type of structure notably allows independent control of the phases of the motor, which will therefore not have to be connected in star or delta configuration.

Each bridge includes four drivable switches 11. These switches are distributed over arms bearing the references A to F, as follows:

- the arms A and B of the unit 9 are linked up to a first phase of the motor 50,
- the arms C and D of the unit 9' are linked up to a second phase, and
- the arms E and F of the unit 9" are linked up to the third phase.

The device 1 also includes an item of connection technology 70 enabling the attachment to the socket of the three-phase electric network. This item of connection technology 70 includes locking means, not represented, for preventing access to the power socket when the device 1 is powered up in charging mode. The item of connection technology 70 is also combined with second locking means, not represented in the appended figures, for preventing access to the conductors (which are then powered up) during the powering mode. The socket also earths the device 1.

This item of connection technology 70 advantageously includes conventional protection and EMC filters for any appliance intended to be linked up to the electric network.

The switch from the powering mode to the charging mode is handled by the remote control unit 12, which notably controls the switches 11 of the arms A to F by way of the communications bus 14 and the intrinsic control units 13. In powering mode, the remote control unit 12 controls the set of arms A, B, C, D, E and F, which makes it possible to generate three-phase currents in a manner analogous to standard control. In charging mode, only the arms B, D and F are controlled by making a step-up transformer, by means of the inductors 60 of the motor 50 of the electrical machine.

More precisely, and in the present example, the remote control unit 12 drives the switches of the arms A and F as follows:

- in powering mode, each of the H-bridges is controlled so as to enable the flowing of an alternating current through the corresponding phase of the motor. The alternating currents flowing through the three phases of the motor are coordinated conventionally so that the motor turns. The switches 11 of the branches A and B can be driven according to a conventional sinusoidal control PWM (Pulse Width Modulation). The two other H-bridges are driven in the same manner, but phase-shifted with respect to each other, preferably at 120° in the case of a three-phase motor,
- in three-phase charging mode, the two switches of each of the arms A, C and E are open, whereas the switches of the arms B, D and F are driven according to a conventional alternating control for a three-phase charger so that each inductor 60 is traversed by an alternating current and so that the PFC (Power Factor Correction) function is produced over all the phases.

The remote control unit—or circuit—12 can also allow an operation of the motor 50 in a degraded mode. In fact, in the case of loss of phase following a failure of the motor 50 or of the inverter 40, the control unit 12 reverses the control of one of the two phases of the motor 50 in operation. This control makes it possible to continue to generate a single turning field, of constant amplitude, not generating any inversion of torque, which is impossible with a conventional three-phase device in which the loss of a phase translates into strong disturbances in torque.

As already described above, the communications bus 14 constitutes an interface making it possible to interconnect the various functional elements of the device 1, namely the remote control unit 12 and the intrinsic control units 13 of the power modules 9, 9' and 9". The bus 14 is equipped for this purpose with a plurality of communications ports, each port being provided to receive a link with the remote unit 12 or one of the intrinsic units 13. The bus 14 can be a series of parallel buses, depending on its frequency and on the number of information items that it can transmit simultaneously.

The remote control unit 12 and the intrinsic control unit 13 thus exchange information in the form of data (for example in the form of bits), which travel via the bus 14. This exchange takes place in both directions, namely the transmission of instructions from the unit 12 towards the units 13 and, in return, the transmission of measurement and/or diagnostic information from the units 13 toward the unit 12.

These various modules can thus alternatively play an emitter device role and a reader device role. In each case, the emitter can position at the same instant all the bits of the bus corresponding to its communications port. At a suitable moment (determined for example by a control signal), the reader reads all the bits at the same time.

The remote control unit 12 is linked up to each intrinsic control unit 13, via the communications bus 14, with a potential barrier, for example by interposing an opto-coupler and/or a transformer.

As already indicated, the unit 13 comprises its own programming logic, independent of that of the unit 12. In particular the logic of the unit 13 makes it possible for the unit itself to execute the actions of opening and closing the switches, as well as the measurement and/or diagnostic actions.

In this way, the remote control unit 12 transmits high-level instructions across the potential barrier of the bus 14 to each intrinsic control unit 13, these instructions appearing in the form of low-voltage signals. From these instructions, each unit 13 executes a program capable of delivering the suitable high-voltage signals with the purpose of performing the control demanded by the unit 12. In the same way, in return, the unit 13 recovers the high-voltage measurement signals, transforms them into low-voltage signals in the form of bits, then transmits them to the remote unit 12 via the bus 14 across the potential barrier, the unit 12 having from that moment only to proceed with the analysis of the information directly provided in the form of data.

Only low-voltage signals thus travel as far as to the remote unit 12, which makes it possible to save a significant number of high-voltage low-voltage converters compared to the solutions of the prior art, the power module autonomously taking charge of the high-voltage operations.

In the present embodiment, the structure of the DC/DC converter 30 has not been represented in order to facilitate the reading of FIG. 2. The structure of this converter is in all ways analogous to that of the inverter 40. More precisely, it includes three power modules (one per phase of the motor 50), these modules being themselves equipped with a cell of drivable switches in the form of an H-bridge structure, as well as an intrinsic control unit. Each intrinsic control unit links up on the one hand the various arms of the H-bridge and on the other hand a communications bus.

In this way, the DC/DC converter 30 constitutes a mirror component of the inverter 40. These two elements can therefore be fabricated in the same way, in the form of an electronic layer with identical structure. In order to confer the "inverter" or "DC/DC converter" function on this electronic layer, it suffices to program the intrinsic control units in a suitable manner, after the fabrication of the component. The inverter and the converter can thus be fabricated industrially, for a significant saving in terms of fabrication costs.

In this case, the communications bus can be the same as the bus 14 used to link up the remote control unit 12 to the units of the inverter, or else an independent communications bus, specifically dedicated to the connection between said remote control unit 12 and the modules of the converter 30.

When implementing the device 1 according to the invention, a plurality of layers can notably be superimposed, such as:
- a first layer corresponding to the inverter 40,
- a second layer corresponding to the remote control unit 12,
- a third layer corresponding to the DC/DC converter 30.

In this way, a large part of the device is produced by simple superposition of electronic layers, the connection between the layers "inverter 40" and "remote control unit 12" being provided by a first communications bus, whereas the connection between the layers "DC/DC converter 30" and "remote control unit 12" is provided by a second communications bus.

The previously described embodiments of the present invention are given by way of example and are in no way limiting. It is expected that those skilled in the art will be able to transpose these examples to other situations, for example when electrical machines of more than three phases are used. It is also expected that those skilled in the art will know how to adapt these examples to the situation where the inverter does not have an H-bridge structure, but a conventional structure with three-phase bridges and switching means of power contactor type to switch from a mode of charging the batteries to a mode of powering the motor.

The invention claimed is:

1. An individual power module that converts an electric current flowing between an accumulator and an alternating-current motor, said module comprising:
    a plurality of switches that are controlled to authorize the powering of the motor and enable the charging of the accumulator; and
    a digital processor connected to the plurality of switches to deliver opening and closing signals to the plurality of switches, and to exchange data with a remote control unit,
    wherein the exchange of data is made across a galvanic isolation barrier,
    said plurality of switches comprising:
        at least one arm formed from two switches, assembled in series, controlled from said digital processor, and,
        means for driving the plurality of switches linked up to said digital processor and the plurality of switches, said driving means being able to supply a current for closing and/or opening the plurality of switches from the opening and/or closing signals of said digital processor.

2. The module as claimed in claim 1, further comprising measuring means linked up to said digital processor.

3. The module as claimed in claim 1, further comprising powering means, linked up at least to said digital processor and/or to the plurality of switches.

4. The module as claimed in claim 1, wherein the plurality of switches are arranged to form an H-bridge structure that can be linked up to a phase of the motor.

5. The module as claimed in claim 1, further comprising at least one decoupling capacitor arranged to protect the plurality of switches.

6. The power module as claimed in claim 1, further comprising a data communications bus, linked up to said digital processor and able to exchange data with said remote control unit, with the galvanic isolation barrier on the bus.

7. The power module as claimed in claim 6, further comprising galvanic isolation on said communications bus.

8. The power module as claimed in claim 6, wherein the digital processor provides at least one of the following functions consisting:
    application of the orders received from the remote unit by the communication bus, wherein the orders relate to a desired output current;
    determination of the orders of an opening/closing of the plurality of switches to be transmitted to the driving means based on the orders related to the desired output current;
    verification of a consistency of an information received by the communication bus;
    production of a diagnosis related to the individual power module; and
    transmission of a complete state of the individual power module to the remote control through the communication bus.

9. The module as claimed in claim 1, wherein the individual power module comprises a plurality of operational amplifiers that deliver a measurement current to a measuring unit, and wherein at least one of the plurality of operational amplifiers comprises a varistor.

10. The module as claimed in claim 1, wherein the galvanic isolation barrier is implemented by a transformer or an opto-coupler.

11. A voltage converter comprising:
at least one individual power module comprising:
- a plurality of switches that are able to power the motor and enable the charging of the accumulator; and
- a digital processor connected to the plurality of switches to deliver opening and closing signals to the plurality of switches, and to exchange data with a remote control unit,
- wherein the exchange of data is made across a galvanic isolation barrier,
- said plurality of switches comprising:
  - at least one arm formed from two switches, assembled in series, controlled from said digital processor, and,
  - means for driving the plurality of switches linked up to said digital processor and the plurality of switches, said driving means being able to supply a current for closing and/or opening the plurality of switches from the opening and/or closing signals of said digital processor; and
- a remote control unit that exchanges data with the digital processor of the module across the galvanic isolation barrier.

12. The converter as claimed in claim 11, further comprising a plurality of power modules and a single remote control unit that exchanges data with each digital processor across a single galvanic isolation barrier.

13. The converter as claimed in claim 11, being an inverter for the combined powering and charging of an accumulator and an alternating-current motor, respectively.

14. The converter as claimed in claim 13, the converter being an inverter and the motor being a poly-phase motor, wherein the inverter comprises a number of power modules equal to the number of phases of said motor, each of said power modules being linked up to one of said phases of said motor.

15. The converter as claimed in claim 11, being a DC/DC converter for the combined powering and charging of an accumulator and an alternating-current motor, respectively.

16. The converter as claimed in claim 15, being arranged to adapt the voltage level between the accumulator and an inverter.

17. An electric device for combined powering and charging, comprising:
- an alternating-current motor;
- an accumulator;
- an inverter for the combined powering of the alternating-current motor and the charging of the accumulator said inverter being equipped with at least one individual power module comprising:
  - a plurality of switches that are able to power the motor and enable the charging of the accumulator; and
  - a digital control unit connected to the plurality of switches to deliver opening and closing signals to the plurality of switches, and to exchange data with a remote control unit,
  - wherein the exchange of data is made across a galvanic isolation barrier;
- a remote control unit, able to exchange data with the digital control unit of the power module or modules to handle the switch from the powering mode to the changing mode.

18. The electric device as claimed in claim 17, comprising:
- a DC/DC converter comprising the at least individual power module that converts an electric current flowing between the accumulator and the alternating-current motor, wherein the DC/DC converter is arranged between the accumulator and the inverter.

19. A method to implement an electric device that combines the powering and charging, comprising an alternating-current motor, an inverter for the combined powering of the alternating-current motor and the charging of the accumulator said inverter being equipped with at least one individual power module that comprises a plurality of switches that are able to power the motor and enable the charging of the accumulator, and a digital control unit connected to the plurality of switches to deliver opening and closing signals to the plurality of switches, and to exchange data with a remote control unit, the exchange of data is made across a galvanic isolation barrier, the electric device further comprises a remote control unit that exchanges data with the digital control unit of the power module or modules to handle the switch from the powering mode to the charging mode, a DC/DC converter comprising the at least one individual power module, the DC/DC converter being arranged between the accumulator and the inverter, the method comprising:
superimposing a plurality of electronic layers, the layers being such that:
  a first layer forms the inverter,
  a second layer forms the remote control unit, and
  a third layer forms the DC/DC converter.

\* \* \* \* \*